(12) United States Patent
Tregoning et al.

(10) Patent No.: US 7,706,018 B2
(45) Date of Patent: Apr. 27, 2010

(54) IMAGE ENHANCEMENT SYSTEM AND METHOD

(75) Inventors: Michael A. Tregoning, Greeley, CO (US); Meing Fai Nigel Cheung, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1213 days.

(21) Appl. No.: 11/263,366

(22) Filed: Oct. 31, 2005

(65) Prior Publication Data

US 2007/0097385 A1 May 3, 2007

(51) Int. Cl.
*H04N 1/00* (2006.01)
*H04N 1/46* (2006.01)

(52) U.S. Cl. .................. 358/1.6; 358/505; 358/509; 358/474

(58) Field of Classification Search .................. 358/445, 358/505, 1.1, 1.6, 1.7, 1.8, 1.5, 1.2, 1.9, 2.1, 358/1.13, 1.14, 1.15, 1.18, 506, 509, 510, 358/512, 513, 514, 530, 474, 475, 480, 482, 358/483, 486, 487, 489, 491, 493, 494, 496, 358/497; 250/208.1, 208.2, 208.3; 348/221.1, 348/272; 382/312, 313, 314, 315, 318, 319; 399/1, 4; 347/2, 3, 5, 14, 23, 118, 119, 224, 347/225, 233, 236, 238, 239, 255, 253, 252, 347/254, 256
See application file for complete search history.

(56) References Cited

U.S. PATENT DOCUMENTS

| 5,144,442 | A | | 9/1992 | Ginosar et al. | |
| 5,221,848 | A | * | 6/1993 | Milch | 250/559.02 |
| 5,555,106 | A | * | 9/1996 | Hsu | 358/512 |
| 5,781,668 | A | * | 7/1998 | Starkweather | 382/318 |
| 5,828,793 | A | * | 10/1998 | Mann | 382/284 |
| 6,813,046 | B1 | * | 11/2004 | Gindele et al. | 358/505 |
| 2003/0234944 | A1 | * | 12/2003 | Gindele | 358/1.9 |

* cited by examiner

*Primary Examiner*—Dov Popovici

(57) ABSTRACT

An image enhancement system includes a scanning device including a photosensor element having a plurality of different color channels. The system also includes an exposure control module configured to vary an exposure time of the plurality of different color channels to generate at least two different exposure level scans of a media object. The system further includes an imaging application configured to generate an enhanced scanned image of the media object using image data obtained from the at least two different exposure level scans.

22 Claims, 2 Drawing Sheets

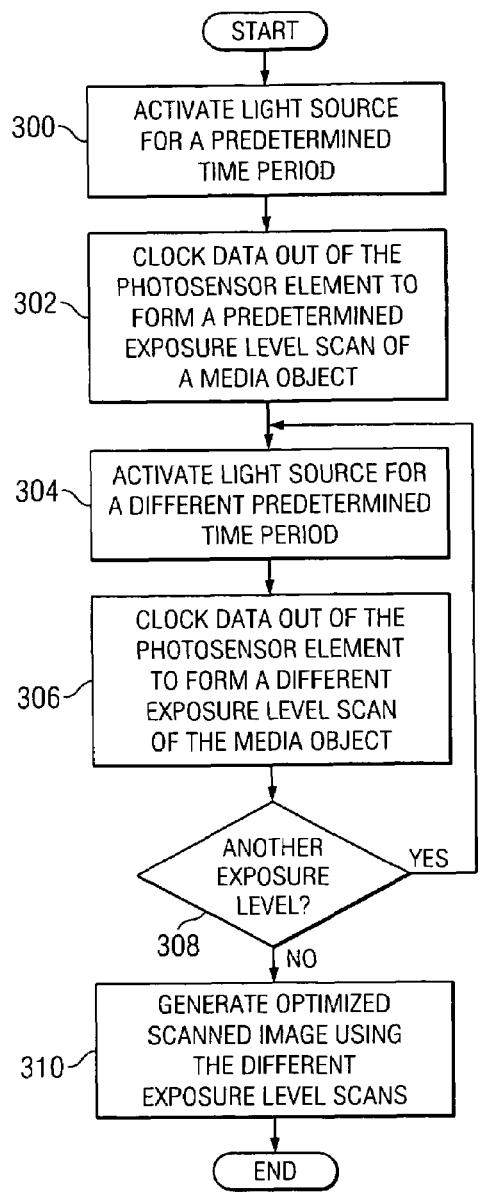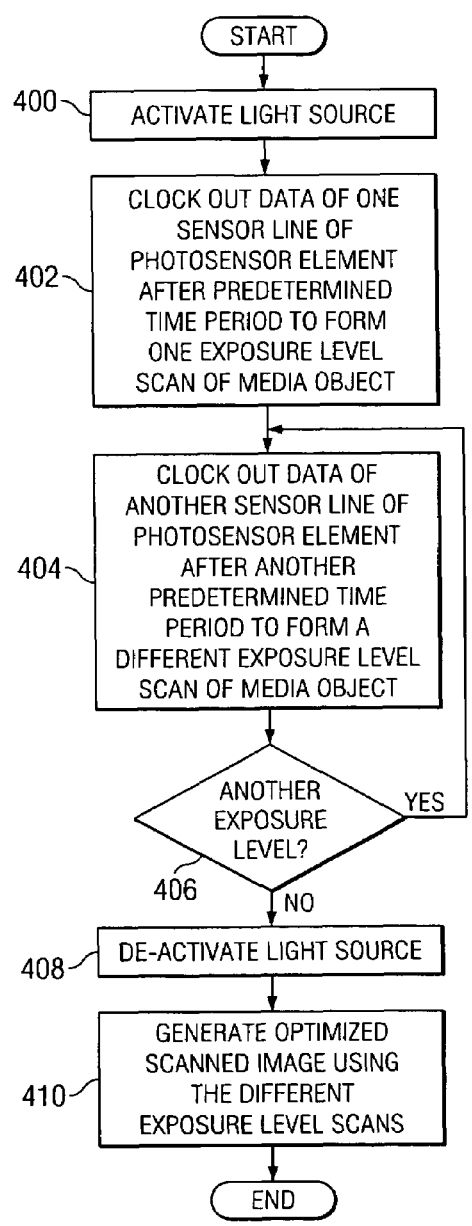

IMAGE ENHANCEMENT SYSTEM AND METHOD

BACKGROUND OF THE INVENTION

Media objects, such as photographs, slides, documents and other types of media, often include image portions of varied lighting (e.g., some portions that are lighter or darker than other portions of the same media object). A scanned image of the media object oftentimes does not capture a desired level of detail and/or contrast for each of the different portions of the media object.

BRIEF DESCRIPTION OF THE DRAWINGS

For a more complete understanding of the present invention and the advantages thereof, reference is now made to the following descriptions taken in connection with the accompanying drawings in which:

FIG. 3 is a flow diagram illustrating an embodiment of an image enhancement method in accordance with the present invention; and FIG. 4 is a flow diagram illustrating another embodiment of an image enhancement method in accordance with the present invention.

DETAILED DESCRIPTION OF THE DRAWINGS

The preferred embodiments of the present invention and the advantages thereof are best understood by referring to FIGS. 1-4 of the drawings, like numerals being used for like and corresponding parts of the various drawings.

Figure 1:
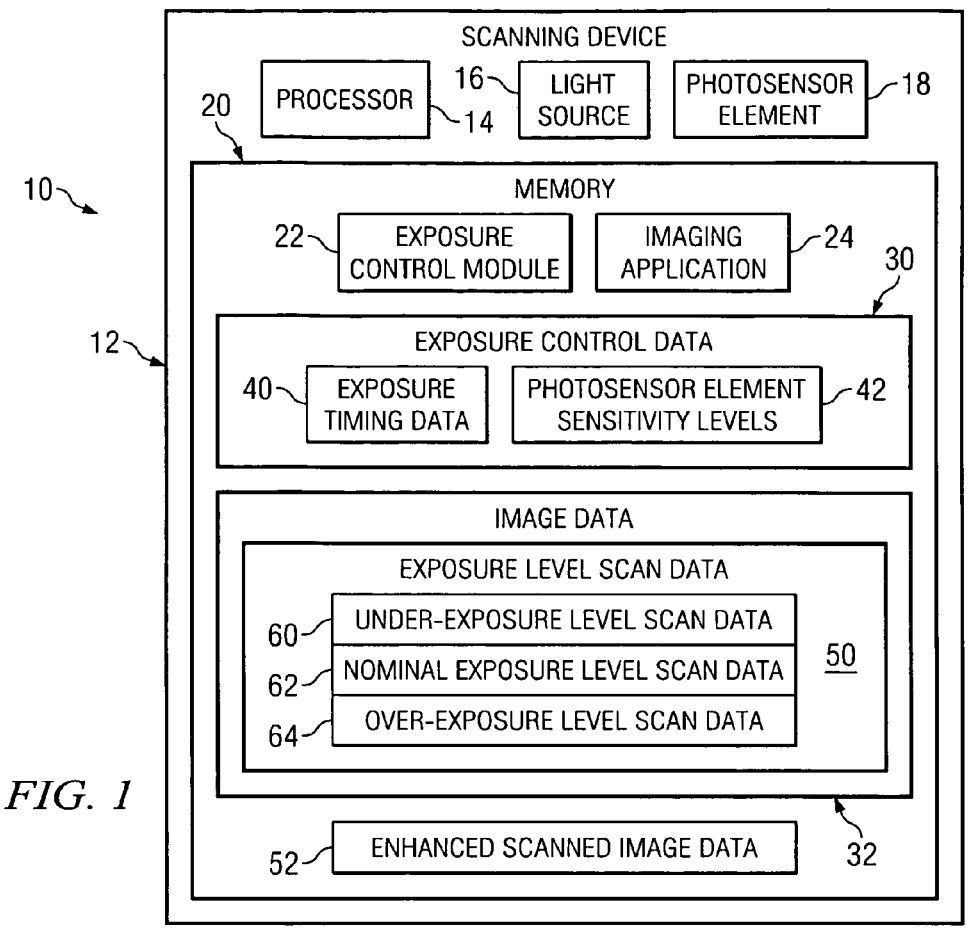
FIG. 1 is a diagram illustrating an embodiment of an image enhancement system in accordance with the present invention.

FIG. 1 is a diagram illustrating an embodiment of an image enhancement system 10 in accordance with the present invention. In the embodiment illustrated in FIG. 1, system 10 comprises a scanning device 12 having a processor 14, a light source 16 and a photosensor element 18. Scanning device 12 may comprise any type of device for generating a scanned image of a media object such as, but not limited to, a scanner, facsimile machine, multi-function machine or copier. In the embodiment illustrated in FIG. 1, light source 16 is preferably a constant light source for generating a substantially constant or non-varying illumination intensity for generating a scanned image of a media object. However, it should be understood that other types of light sources may be used in scanning device 12. Photosensor element 18 may comprises a charge-coupled device (CCD) or any other type of device for converting light impinging thereon into electric signals. It should be understood that embodiments of the present invention may be used in either a reflective or a transmissive scanning application.

In the embodiment illustrated in FIG. 1, scanning device 12 also comprises a memory 20 having an exposure control module 22 and an imaging application 24. Exposure control module 22 and imaging application 24 may comprise hardware, software, or a combination of hardware and software. In FIG. 1, exposure control module 22 and imaging application 24 are illustrated as being stored in memory 20 so as to be accessible and/or executable by processor 14. However, it should be understood that exposure control module 22 and/or imaging application 24 may be otherwise stored, even remote from scanning device 12. Embodiments of the present invention use exposure control module 22 to control an exposure time of photosensor element 18 to generate at least two different scans of a media object at different exposure levels (e.g., an over-exposure scan level, a nominal exposure scan level, an under-exposure scan level, etc.). Imaging application 24 is used to generate an enhanced scanned image of the media object using the different exposure level scans of the media object.

In the embodiment illustrated in FIG. 1, memory 20 comprises exposure control data 30 and image data 32. Exposure control data 30 comprises information associated with different exposure times for generating different exposure level scans of a media object. For example, in one embodiment of the present invention, exposure control data 30 comprises exposure timing data 40 having information associated with different pre-determined time periods for exposing photosensor element 18 to generate different exposure level scans of a media object. In another embodiment of the present invention, exposure control data 30 comprises information associated with different response sensitivity levels of photosensor element 18. For example, in this embodiment, photosensor element 18 is configured having different sensor lines of different response sensitivities such that the different sensitivity levels generate different exposure level scans of a media object. Accordingly, in the embodiment illustrated in FIG. 1, exposure control data 30 comprises photosensor element sensitivity levels 42 having information associated with the different sensitivities of the different sensor lines of photosensor element 18.

Image data 32 comprises information associated with scanned images of a media object. For example, in the embodiment illustrated in FIG. 1, image data 32 comprises exposure level scan data 50 and enhanced scanned image data 52. Exposure level scan data 50 comprises information associated with scanned images of a media object at different exposure levels. For example, in the embodiment illustrated in FIG. 1, exposure level scan data 50 comprises under-exposure level scan data 60, nominal exposure level scan data 62 and over-exposure level scan data 64. Under-exposure level scan data 60 comprises information associated with a scanned image of the media object using light source 16 to form an under-exposed scanned image of the media object. For example, in some embodiments of the present invention, an under-exposed level scan of the media object is obtained by exposing photosensor element 18 for a relatively short duration or time period. In some embodiments of the present invention, an under-exposed level scan of the media object is obtained using sensor lines of photosensor element 18 having a predetermined under-exposure sensitivity level.

Nominal exposure level scan data 62 comprises information associated with a scanned image of a media object to generate a nominal scan of the media object (e.g., a scan of the media object which is generally neither under-exposed or over-exposed). In some embodiments of the present invention, a nominal exposure level scan of the media object is formed by exposing photosensor element 18 for a predetermined period of time (e.g., longer than for an under-exposed level scan of the media object). In other embodiments of the present invention, a nominal exposure level scan of the media object is obtained using sensor lines of photosensor element 18 having a predetermined sensitivity level for generating a nominal exposure level scan.

Over-exposure level scan data 64 comprises information associated with a scanned image of a media object at an over-exposed scan level. In some embodiments of the present invention, an over-exposed level scan of the media object is obtained by exposing photosensor element 18 for a predetermined time period (e.g., longer than for an under-exposed and nominally exposed scan of the media object). In other embodiments of the present invention, an over-exposure level scan of the media object is obtained using sensor lines of photosensor element 18 having a predetermined sensitivity corresponding to an over-exposed scan level.

Enhanced scanned image data 52 comprises information associated with an enhanced image of the media object formed and/or otherwise generated using at least two different exposure levels. For example, in some embodiments of the present invention, an enhanced scanned image 52 is generated using each of an under-exposure level scan 60, a nominal exposure level scan 62 and/or an over-exposure level scan 64 of the media object. However, it should be understood that an enhanced scanned image 52 may be generated using a fewer or greater quantity and/or type of exposure level scans (e.g., from a combination of an under-exposure level scan 60 and a nominal exposure level scan 62, an under-exposure level scan 60 and an over-exposure level scan 64, or a nominal exposure level scan 62 and an over-exposure level scan 64). Further, it should be understood that additional scans at varying exposure levels may be combined with any of the aforementioned combinations to form the enhanced scanned image of the media object.

Figure 2:
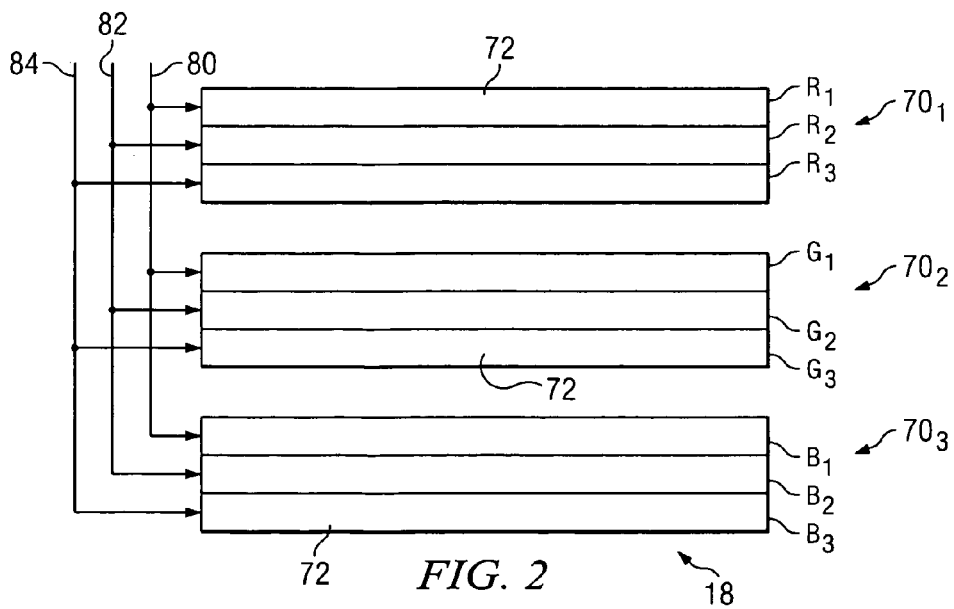
FIG. 2 is a diagram illustrating an embodiment of a photosensor element of the image enhancement system of FIG. 1.

FIG. 2 is a diagram illustrating an embodiment of photosensor element 18 in accordance with the present invention. In the embodiment illustrated in FIG. 2, photosensor element 18 comprises three different color channels $70_1$, $70_2$ and $70_3$ corresponding to colors red, green and blue, respectively. However, it should be understood that photosensor element 18 may comprise a greater or fewer quantity of different color channels. As used herein, "color" shall include white, gray scale, black, etc. In the embodiment illustrated in FIG. 1, each channel 70 of photosensor element 18 comprises a plurality of sensor lines 72. In the embodiment illustrated in FIG. 2, each channel 70 comprises three sensor lines 72. However, it should be understood that a greater or fewer quantity of sensor lines 72 may be provided for each channel 70. Thus, in the embodiment illustrated in FIG. 2, channel $70_1$ comprises sensor lines 72 designated as $R_1$, $R_2$ and $R_3$ corresponding to three different sensor lines 72 for the color red. Channel $70_2$ comprises three sensor lines 72 designated as $G_1$, $G_2$ and $G_3$ corresponding to the color green. Channel $70_3$ comprises three sensor lines 72 designated as $B_1$, $B_2$ and $B_3$ corresponding to the color blue. In some embodiments of the present invention, different sensor lines 72 of the different channels 70 of photosensor element 18 are grouped and/or otherwise arranged into sets. For example, in the embodiment illustrated in FIG. 2, sensor lines 72 designated as $R_1$, $G_1$ and $B_1$ comprise sensor line set 80, sensor lines 72 designated as $R_2$, $G_2$ and $B_2$ comprise sensor line set 82, and sensor lines 72 designated as $R_3$, $G_3$ and $B_3$ comprise sensor line set 84. It should be understood that a set of sensor lines 72 may comprise a greater or fewer quantity of sensor line 72 (e.g., a single sensor line 72 or a greater quantity of sensor lines 72).

Embodiments of the present invention enable different exposure level scans to be generated using a variety of different types of methods and/or photosensor 18 configurations. For example, in one embodiment of the present invention, photosensor element 18 is configured as a three-channel photosensor element 18 having a single sensor line 72 for each channel 70. In this example, photosensor element 18 is exposed for at least two different time durations or periods to generate at least two different exposure level scans of a media object. For example, in the above example, a first scan of the media object is performed for a first predetermined exposure time 40 of photosensor element 18 (e.g., one millisecond), and another scan of the media object is performed for an exposure time different than the exposure time for the first scan (e.g., two milliseconds). Thus, the different exposure times for the respective scans generate at least two different exposure level scanned images of the media object. Imaging application (FIG. 1) uses the results of the two different exposure scans of the media object to generate the enhanced scanned image 52 (FIG. 1) (e.g., by combining, merging and/or otherwise manipulating the scanned image content of different exposure level scans). It should be understood that the quantity of scans and associated exposure times may be varied to generate a desired level of exposure of the media object (e.g., three different scans at three different exposure times to generate, for example, an under-exposed level scan 60, a nominally exposed level scan 62 and an over-exposed level scan 64). Embodiments of the present invention may be configured to expose photosensor element 18 for different time durations or periods for generating the different exposure level scans in a variety of ways. For example, in one embodiment, the exposure time sequence may be configured as exposure for one millisecond, then two milliseconds, then four milliseconds, and then for the next scan or scan line, exposure for four milliseconds, then two milliseconds, then one millisecond, thereby taking advantage of a present scan time setting (e.g., a four millisecond scan followed by another four millisecond scan instead of re-setting for another one millisecond scan). However, it should be understood that other scan time sequences may be used.

In another embodiment of the present invention, photosensor element 18 is configured such that each set of sensor lines 72 comprises a different response sensitivity level such that each set of sensor lines 72 are used to generate a different exposure level scan of a media object. For example, in this embodiment of the present invention, photosensor element 18 comprises a nine-line photosensor element 18 having three sets 80, 82 and 84 of sensor lines 72. In the above example, each sensor line set 80, 82 and 84 is configured having a different response sensitivity. For example, in some embodiments of the present invention, sensor line set 80 is configured having a relatively low response sensitivity, sensor line set 82 is configured having a nominal response sensitivity, and sensor line set 84 is configured having a relatively high response sensitivity. Thus, in the above example, a single scan of the media object is performed at a relatively constant illumination intensity such that sensor line set 80 is used to form an under-exposed level scan 60 of the media object, sensor line set 82 is used to form a nominal exposure level scan 62 of the media object, and sensor line set 84 is used to form an over-exposed level scan 64 of the media object. Thus, in the above example, each set 80, 82 and 84 of sensor lines has accumulated a different amount of charge corresponding to a different exposure level scan of the media object. The sets 80, 82 and 84 of sensor lines may be clocked out in parallel and the different exposure level scans used to generate an enhanced scanned image 52. Imaging application 24 (FIG. 1) is used to generate enhanced scanned image 52 using the different exposure level scans 60, 62 and 64 of the media object. In the above example, three different response sensitivity levels are used in photosensor element 18. However, it should be understood that a greater or fewer quantity of response sensitivity levels may be used.

As an illustrative example of the above-described embodiment, for a red sensor color, three different red sensor lines 72 are used each having a different sensitivity level (e.g., R1, R2 and R3, where R1 has the greatest sensitivity (over-exposed), R2 has a nominal sensitivity, and R3 has the least sensitivity (under-exposed). Thus, in this example, for a fixed exposure time, when the lines R1, R2 and R3 are clocked out in parallel, each sensor line 72 is in a different saturation state each having collected different amounts of charge. The data clocked out of each sensor line R1, R2 and R3 is used by imaging application 24 to generate an enhanced scanned image. Thus, in this embodiment, three scanned images of the media object, each at a different exposure level, are generated from a single scan of the media object.

In yet another embodiment of the present invention, different exposure scan levels of a media object are obtained by exposing all lines 72 for the same time period while clocking out different sets of sensor lines 72 at different durations or intervals of the exposure time period. For example, in this embodiment, photosensor element 18 is configured having a plurality of sets of sensor lines 72 each of a generally constant or same response sensitivity. For example, in some embodiments of the present invention, photosensor element 18 is configured having three sensor line sets 80, 82 and 84 each of a generally constant or same sensitivity level. Exposure control module 22 (FIG. 1) is used to clock out data from each sensor line set 80, 82 and 84 after a different predetermined time period or exposure duration. For example, in some embodiments of the present invention, a media object is illuminated with light source 16 for a predetermined period of time (e.g., four milliseconds). In the above example, data associated with sensor line set 80 is clocked out after one millisecond, data associated with sensor line set 82 is clocked out after two milliseconds, and data associated with sensor line set 84 is clocked out at four milliseconds. Preferably, to prevent interference and/or charge bleed between the different sets 80, 82 and 84 of sensor lines 72, each set is shuttered or flushed before acquiring data from another set (e.g., set 80 is shuttered before clocking data out of set 82, and sets 80 and 82 are shuttered before clocking data out of set 84). Thus, in the above example, each sensor line set 80, 82 and 84 is exposed for the same period of time (e.g., four milliseconds) but data clocked out of each sensor line set 80, 82 and 84 at different intervals to form different exposure level scans of the media object. Thus, in the above example, sensor line set 80, being clocked out at one millisecond, forms an under-exposed level scan 60, sensor line set 82, being clocked out at two milliseconds, forms a nominal exposure level scan 62, and sensor line set 84, being clocked out at four milliseconds, forms an over-exposed level scan 64. Imaging application 24 (FIG. 1) generates enhanced scan image 52 using the different exposure level scans 60, 62 and 64. It should be understood that the quantity of sensor line sets, and exposure intervals, may be otherwise varied to provide different exposure level scans of the media object. It should be understood that in the above examples, the different exposure scans may be obtained on full scanning passes or scan line-by-scan line methods.

As an illustrative example of the above-described embodiment, for three color red sensor lines 72 (e.g., R1, R2 and R3), each of the red sensor lines 72 are exposed for the same time period (e.g., 4 milliseconds). After one millisecond, sensor line R1 is clocked out (under-exposed) while R2 and R3 continue being exposed. After another one millisecond (two milliseconds after the start of the exposure time period), sensor line R2 is clocked out (nominal exposure) while sensor line R3 continues being exposed. After another two milliseconds (four milliseconds after the start of the exposure time period), R3 is clocked out (over-exposed). Thus, in this embodiment, the scan of the media object is controlled by the longest exposure time (e.g., four milliseconds) and can be repeated after shuttering the sensor lines 72.

FIG. 3 is a flow diagram illustrating an embodiment of an image optimization method in accordance with the present invention. The method begins at block 300, where exposure control module 22 activates light source 16 for a predetermined exposure time period. At block 302, exposure control module 22 clocks data out of photosensor element 18 to form a predetermined exposure level scan of a media object. At block 304, exposure control module 22 activates light source 16 for a second and different predetermined exposure time period (e.g., an exposure time greater than or less than the exposure time of block 300). At block 306, exposure control module 22 clocks data out of photosensor element 18 to form a different exposure level scan of the media object. At decisional block 308, a determination is made whether another exposure level scan is to be obtained. If another exposure level scan is to be obtained, the method returns to block 304. If another exposure level is not obtained, the method proceeds to block 310, where imaging application 24 generates an enhanced scanned image 52 of the media object using the results of different exposure level scans of the media object obtained at blocks 302 and 306. In the above method depicted by FIG. 3, light source 16 is activated at two separate times for two different exposure intervals. However, it should be understood that light source 16 may be activated once data clocked out of photosensor element 18 after two different exposure time periods (e.g., clocked out after one millisecond of exposure and then again after an additional two milliseconds of exposure).

FIG. 4 is a flow diagram illustrating another embodiment of an image optimization method in accordance with the present invention. The method begins at block 400, where exposure control module 22 activates light source 16. At block 402, exposure control module 22 clocks data out of at least one sensor line set 80, 82 or 84 of photosensor element 18 to form a predetermined exposure level scan of the media object. At block 404, exposure control module 22 shutters the previously clocked sensor line set 80, 82 or 84 and clocks data out of another sensor line set 80, 82 or 84 to form another, different exposure level scan of the media object. At decisional block 406, a determination is made whether another exposure level scan is desired. If another exposure level scan is desired, the method returns to block 404, where the previously clocked sets 80, 82 or 84 are shuttered and another sensor line set 80, 82 or 84 is clocked out. If another exposure level scan is not desired at decisional block 406, the method proceeds to block 408, where exposure control module 22 deactivates light source 16. At block 410, imaging application 24 generates enhanced scanned image 52 using the different exposure level scans obtained at blocks 402 and 404.

Thus, embodiments of the present invention provide a variety of different methods for obtaining different exposure level scans of a media object, and using different exposure levels of a scanned media object to generate an enhanced scanned image of the media object. Accordingly, embodiments of the present invention enable enhanced dark and light details to be produced in the scanned image of a media object.

What is claimed is:

1. An image optimization system, comprising:
   a scanning device comprising a photo sensor element having a plurality of different color channels; and
   an exposure control module configured to vary an exposure time of the plurality of different color channels to generate at least two different exposure level scans of a media object; and an imaging application configured to generate an enhanced scanned image of the media object using image data obtained from the at least two different exposure level scans.

2. The system of claim 1, wherein the exposure control module is configured to generate at least one under-exposure level scan of the media object.

3. The system of claim 1, wherein the exposure control module is configured to generate at least one over-exposure level scan of the media object.

4. The system of claim 1, wherein each of the plurality of different color channels comprises a plurality of sensor lines.

5. The system of claim 1, wherein the exposure control module is configured to vary an exposure time for each sensor line set of the plurality of different color channels.

6. The system of claim 1, wherein the exposure control module is configured to expose the plurality of different color channels for at least two different time periods.

7. The system of claim 1, wherein the exposure control module is configured to clock data out of at least two different sets of sensor lines of the plurality of different color channels at two respectively different time periods.

8. The system of claim 1, wherein the exposure control module is configured to activate a light source for a predetermined time period and clock data out of at least two different sets of sensor lines of the plurality of different color channels at different intervals of the predetermined time period.

9. An image optimization method, comprising:
varying an exposure time of a plurality of different color channels of a photosensor element to generate at least two different exposure level scans of a media object; and
generating an enhanced scanned image of the media object using image data obtained from the at least two different exposure level scans.

10. The method of claim 9, further comprising varying the exposure time to generate at least one under-exposure level scan of the media object.

11. The method of claim 9, further comprising varying the exposure time to generate at least one over-exposure level scan of the media object.

12. The method of claim 9, wherein varying an exposure time comprises varying an exposure time for each sensor line set of the plurality of different color channels.

13. The method of claim 9, wherein varying an exposure time comprises exposing the plurality of different color channels for at least two different time periods.

14. The method of claim 9, further comprising clocking data out of at least two different sets of sensor lines of the plurality of different color channels at two respectively different time periods.

15. The method of claim 9, further comprising activating a light source for a predetermined time period and clocking data out of at least two different sets of sensor lines of the plurality of different color channels at different durations within the predetermined time period.

16. An image optimization system, comprising:
means for varying an exposure time of a plurality of different color channels of a photosensor element to generate at least two different exposure level scans of a media object; and means for generating an enhanced scanned image of the media object using image data obtained from the at least two different exposure level scans.

17. The system of claim 16, wherein the varying means comprises means for varying an exposure time for each sensor line set of the plurality of different color channels.

18. The system of claim 16, wherein the varying means comprises means for exposing at least two different sets of sensor lines of the plurality of different color channels for at least two respectively different time periods.

19. The system of claim 16, wherein the varying means comprises means for clocking data out of at least two different sets of sensor lines of the plurality of different color channels at two respectively different time periods.

20. The system of claim 16, wherein the varying means comprises means for activating a light source for a predetermined time period and clocking data out of at least two different sets of sensor lines of the plurality of different color channels at different intervals of the predetermined time period.

21. A method comprising:
for each scan of a plurality of scans of a media object, where each scan is associated with a different exposure level;
activating a light source for a predetermined time period corresponding to the different exposure level of the scan, where the light source outputs light towards a photosensor element;
after the predetermined time period has expired, clocking data out of the photosensor element to acquire the different exposure level of the scan;
after all the scans have been acquired, generating an enhanced scanned image of the media object using image data obtained from the plurality of scans,
wherein the predetermined time period in which the light source is activated is different for the different exposure level of each scan.

22. A method comprising:
activating a light source, where the light source outputs light towards a plurality of photosensor element parts, where each photosensor element part is associated with a different exposure level, and where the different exposure level of each photosensor element part is associated with a different predetermined time period;
in order of duration from a shortest predetermined time period of the different predetermined time periods of the different exposure levels of the photosensor element parts, to a longest predetermined period of the different exposure levels of the photosensor element parts,
upon expiration of the different predetermined time period associated with the different exposure level of each photosensor element part, clocking data out of the photosensor element part to acquire a scan at the different exposure level;
after all the different predetermined time periods have expired,
deactivating the light source; and,
generating an enhanced scanned image of a media object using image data obtained from scans at all the different exposure levels.

* * * * *

UNITED STATES PATENT AND TRADEMARK OFFICE
CERTIFICATE OF CORRECTION

PATENT NO. : 7,706,018 B2 Page 1 of 1
APPLICATION NO. : 11/263366
DATED : April 27, 2010
INVENTOR(S) : Michael A. Tregoning et al.

It is certified that error appears in the above-identified patent and that said Letters Patent is hereby corrected as shown below:

In column 6, line 62, in Claim 1, delete "photo sensor" and insert -- photosensor --, therefor.

Signed and Sealed this

Twenty-fourth Day of August, 2010

David J. Kappos
*Director of the United States Patent and Trademark Office*